(12) United States Patent
Ariizumi

(10) Patent No.: US 9,080,689 B2
(45) Date of Patent: Jul. 14, 2015

(54) FLOAT TYPE DRAIN TRAP AND METHOD FOR DISCHARGING DRAIN WATER

(71) Applicant: FUKUHARA CO., LTD., Yokohama, Kanagawa (JP)

(72) Inventor: Takehito Ariizumi, Kanagawa (JP)

(73) Assignee: FUKUHARA CO., LTD., Kanagawa (JP)

( * ) Notice: Subject to any disclaimer, the term of this patent is extended or adjusted under 35 U.S.C. 154(b) by 35 days.

(21) Appl. No.: 14/078,015

(22) Filed: Nov. 12, 2013

(65) Prior Publication Data
US 2014/0130879 A1    May 15, 2014

(30) Foreign Application Priority Data
Nov. 14, 2012   (JP) .................. 2012-263548

(51) Int. Cl.
*F16K 31/26*   (2006.01)
*F16K 31/18*   (2006.01)

(52) U.S. Cl.
CPC ............... *F16K 31/18* (2013.01); *F16K 31/265* (2013.01)

(58) Field of Classification Search
CPC ......... F16K 31/18; F16K 31/20; F16K 31/22; F16K 31/24; F16K 31/26; F16K 31/265
USPC ................. 137/192, 434, 435, 448
See application file for complete search history.

(56) References Cited

U.S. PATENT DOCUMENTS

| 2,208,785 | A | * | 7/1940 | Armstrong | 137/397 |
| 2,525,014 | A | * | 10/1950 | Berge | 137/418 |
| 2,737,364 | A | * | 3/1956 | Handwerk | 251/157 |
| 4,527,584 | A |   | 7/1985 | Miller |  |
| 6,886,589 | B2 | * | 5/2005 | Oretti | 137/418 |
| 2006/0272705 | A1 | * | 12/2006 | Sugawara | 137/192 |

FOREIGN PATENT DOCUMENTS

| CH | 77969 | 6/1918 |
| JP | 2000-002399 | 1/2000 |
| JP | 2002-139172 | 5/2002 |
| JP | 2005-180677 | 7/2005 |
| JP | 2011-106524 | 6/2011 |
| JP | 2012-077903 | 4/2012 |

OTHER PUBLICATIONS

Office Action issued in corresponding German Patent Application No. 102013112517.4, issued on Apr. 7, 2015 with an English translation.

* cited by examiner

*Primary Examiner* — Craig Schneider
*Assistant Examiner* — Ian Paquette
(74) *Attorney, Agent, or Firm* — Hamre, Schumann, Mueller & Larson, P.C.

(57) ABSTRACT

In a float type drain trap, drain water separated from gas-liquid mixture is discharged from a discharge opening. The float type drain trap is provided with a float, an valve and a spring. The float and the valve are connected by the spring. The spring is compressed by a buoyancy of the float. A valve seat is opened and closed by a force of the compressed spring so as to intermittently discharge the drain water from the discharge opening.

8 Claims, 13 Drawing Sheets

FLOAT TYPE DRAIN TRAP AND METHOD FOR DISCHARGING DRAIN WATER

BACKGROUND OF THE INVENTION

1. Field of the Invention

The present invention relates to a float type drain trap and a method for discharging drain water.

2. Related Art

Conventionally, there are known a technology about a buoyancy type drain water discharging method and drain trap (for example, see JP-A-2005-180677 and JP-2012-077903).

According to JP-A-2005-180677, a drain trap is provided with a float having a float main body in its one end and floatable by water with an arm as its center, a rubber valve seat in the other end, and a rotation shaft in its central bent portion. A case including a case main body having a flow-in opening for receiving drain water therein and a discharge opening for discharging the drain water therefrom, a valve seat situated in the discharge opening, and a float bracket for holding the rotation shaft to allow the float to rotate are integrated to configure a case. By locating the rotation shaft in the float bracket in the case, when the drain water has not flowed up to a given position of the case, the rubber valve seat closes the valve seat by the dead load of the float. When the drain water has flowed to or beyond the given position of the case, the rubber valve seat opens the valve seat by the buoyancy of the float main body. In the drain trap, a magnet is interposed in any position of the arm between the float main body and the rotation shaft, and a partner member capable of generating an attraction force due to the magnet is disposed in any position inside the case. The rubber valve seat closes and opens the valve seat according to the relationship of moment to be determined by the dead load of the float, the buoyancy, the attraction force and the positions where they are generated.

According to JP-A-2012-077903, in a float type drain trap, a gas-liquid mixture of compressed air and drain water generated from the compressed air is received from a flow-in opening formed in an upper portion of a cover, and the drain water is separated from the gas-liquid mixture and is discharged from a discharge opening formed in a lower portion of a side wall. In the drain trap, a first permanent magnet constituting part of a float and a second permanent magnet constituting part of a valve are swung, when the first and second permanent magnets pass each other, there are generated mutually repelling magnetic power, and the repelling power opens and closes a valve seat connected to the discharge opening, whereby the drain water is discharged intermittently.

However, the above-mentioned conventional technologies have the following problems.

Firstly, in the drain trap using a conventional direct magnetic force system in the attraction power is generated because the magnet and partner member are directly attracted to each other, when they are attracted, strong magnetic force is generated but, when they are distant from each other even slightly, the magnetic force damps in reverse proportion to square of the distance. Especially, the magnetic force varies due to adhesion of foreign substances such as dust and dimensional errors, resulting in a problem that stable magnetic force cannot be obtained.

Next, since the float and rubber valve seat are formed integrally and thus the rubber seat valve operates correspondingly to the float, the degrees of opening of the valve seat are determined by the positions of the water surface through the float. Therefore, frequently, the valve seat opens half at an equilibrium point where the flow-in and discharge of the drain water coincide with each other, whereby the drain water is discharged while dripping successively. Further, since the magnetic force damps in reverse proportion to square of the distance, when the partner member is distant from the magnet even slightly, the partner member is easily out of the influential range of the magnetic force, which facilitate the generation of the equilibrium point. As a result, the drain water cannot be discharged energetically and intermittently, which makes it difficult to remove slime, dust and the like adhered to the small pores of the valve seat and the like.

Further, since the valve must be attracted with the negative pressure of the gushing of the compressed air discharged simultaneously with the drain water, the lowest water surface is situated at the discharge opening and thus the discharge of the compressed air cannot be stopped, resulting in the large loss of the compressed air.

In addition, in the conventional drain trap employing an indirect magnetic force system which uses the mutual repulsions of the magnetic forces respectively generated by the first permanent magnet constituting part of the float and the second permanent magnet constituting part of the valve when they are swung and are thereby caused to pass each other, when iron powder or the like is contained in the drain water, the magnets attract the iron powder, resulting in various troubles.

SUMMARY OF THE INVENTION

In accordance with one or more embodiments, in a float type drain trap, a gas-liquid mixture of compressed air and drain water generated from the compressed air is received from a flow-in opening 10a formed in an upper portion of a cover 10 and the drain water separated from the gas-liquid mixture is discharged from a discharge opening 10b formed in a lower portion of a side wall. The float type drain trap is provided with a float 20, an valve 50, and a spring 60. The float 20 and the valve 50 are connected to each other by the spring 60. The spring 60 is compressed by a buoyancy of the float 20. A valve seat 15 is opened and closed by a force of the compressed spring 60 so as to intermittently discharge the drain water from the discharge opening 10b.

Moreover, in accordance with one or more embodiments, a drain water discharging method is provided with: receiving a gas-liquid mixture of compressed air and drain water generated from the compressed air from a flow-in opening 10a; separating the drain water from the gas-liquid mixture and discharging the drain water from a discharge opening 10b; connecting a float 20 and a valve 50 to each other by a spring 60; compressing the spring 60 by a buoyancy of the float 20; and opening and closing a valve seat 15 connected to the discharge opening 10b by a force of the compressed spring 60 so as to intermittently discharging the drain water.

DETAILED DESCRIPTION OF THE EXEMPLARY EMBODIMENTS

Exemplary embodiments of the invention will be described in detail by reference to drawings. Note that, the embodiments described herein are not intended to limit the invention but only to exemplify the invention, and all features or combinations of the features of the embodiment are not always essential to the invention.

Figure 1:
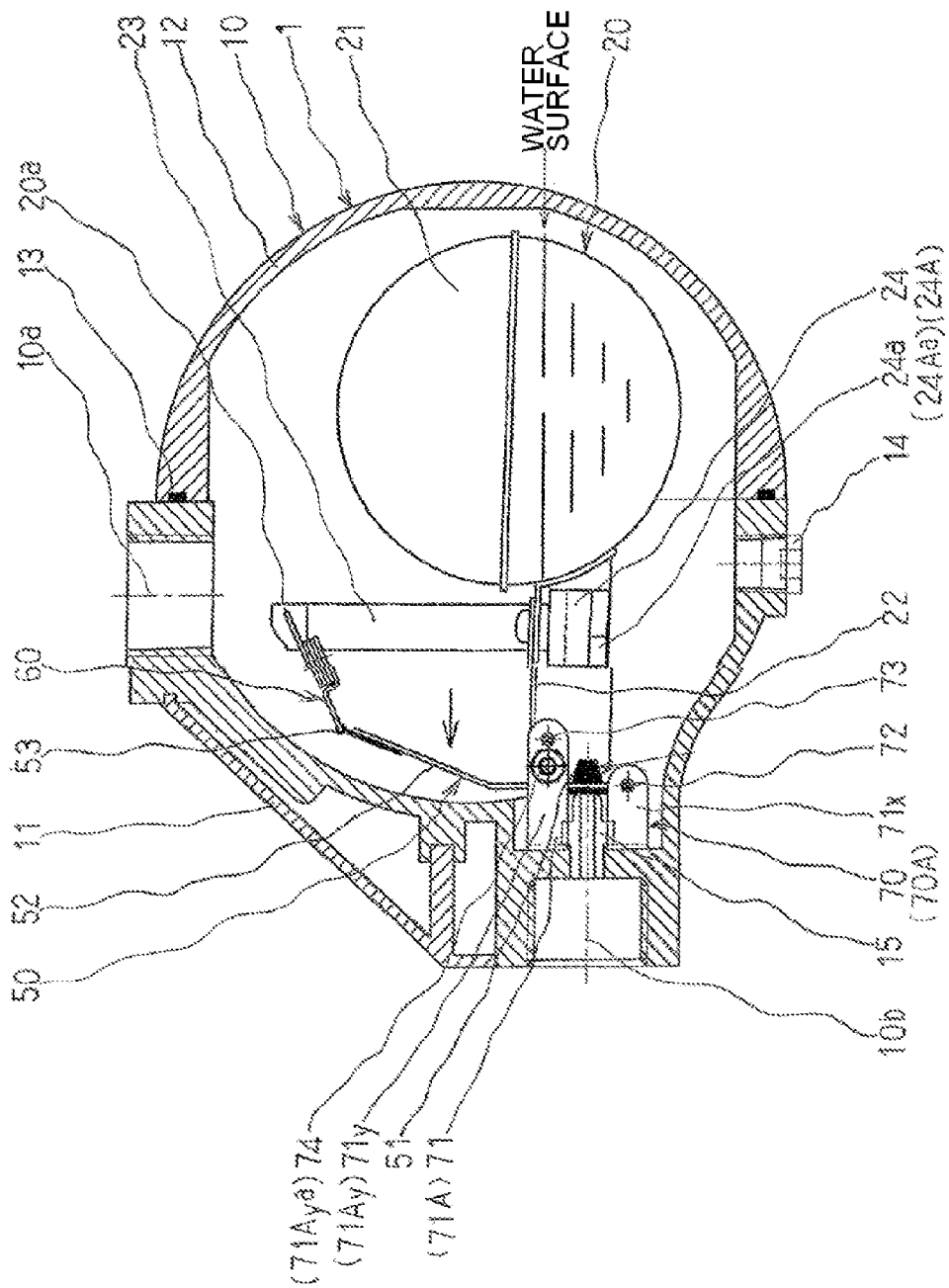
FIG. 1 is a view of a whole of a drain trap according to an embodiment.

As shown in FIG. 1, reference numeral 1 designates a drain trap which comprises as an integral unit: a substantially spherical-shaped cover 10 which stores therein compressed air and drain water and includes a valve seat 15 for discharging drain water; a float 20 which includes as an integral unit a float main body 21, a float arm 22, a spring arm 23 and the like and also which can be swung about a float pivot shaft 73 to be thereby moved up and down according to increase and decrease of the drain water stored in the cover 10; and, a valve 50 which includes a valve body 51 for opening and closing the valve seat 15, a valve arm 52 and the like formed as integral unit and also which can be swung about a valve pivot shaft 72. Further, a hole 20a formed in the leading end of a spring arm 23 of the float 20 is integrally connected through a spring 60 including a torsion coil spring 60 to a spring bearing 53 situated on the leading end of a valve arm 52 of the valve 50. Here, the connecting portions of the spring 60 including the torsion coil spring 60, float 20 and valve 50 can be swung and moved.

Describing the above structure more specifically, the cover 10 is integrally constituted in a spherical shape or in a substantially spherical shape of the following composing parts: that is, a first cover 11 and a second cover 12 respectively having a substantially semispherical shape; an O ring 13; a blank plug 14 to be used when drain water stored within the drain trap 1 must be discharged completely; the valve seat 15 serving as a flow passage when the drain water stored within the drain trap 1 is discharged to the outside; a solid bracket 71, 71A in which a float bracket 71y, 71Ay for positioning the float pivot shaft 73 and a valve body bracket 71x for positioning the valve pivot shaft 72 are formed as an integral unit; an arm stopper 74, 71Aya provided on the float bracket 71y, 71Ay for setting a limit on the movement of the valve 50; bolts (not shown); and the like. And, the cover 10 is completely sealed by the O ring 13 to prevent the drain water against leakage, except for a flow-in opening 10a formed near the top portion of the cover 10 and a discharge opening 10b formed in the lower portion existing relatively near to the bottom portion of the side wall of the cover 10. Here, instead of the O ring 13, a packing or a liquid packing may also be used.

In this case, gas-liquid mixture (in which compressed air and drain water are mixed) is allowed to flow from the flow-in opening 10a into the cover 10. Also, the separated drain water can be discharged from the discharge opening 10b. Further, the discharge of the drain water to the outside is carried out by opening the valve seat 15, which is connected to the discharge opening 10b of the side wall of the cover 10, using the valve body 51 of the valve 50.

Figure 13:
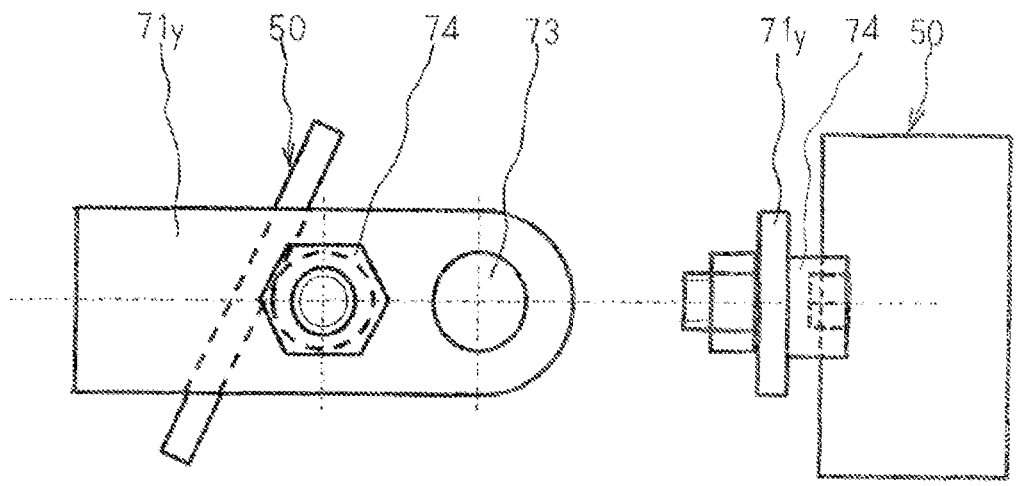
FIG. 13 is a view of an arm stopper.
Figure 14:
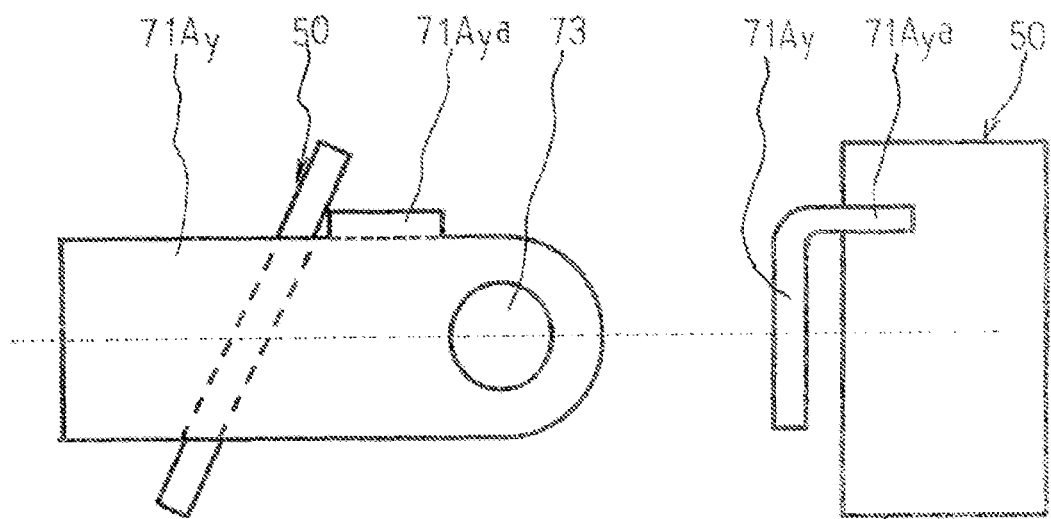
FIG. 14 is a view of another arm stopper.

The end portion of the valve 50 is situated in the valve body bracket 71x through the valve pivot shaft 72 and can be swung about the valve pivot shaft 72 by the compression force of the torsion coil spring 60; and, in order to determine the position of the full-open state of the valve seat 15, there is necessary the arm stopper 74, 71Aya. For this purpose, as shown in FIG. 13, there may be used a machine-screw type stopper 74 in which a machine screw is disposed in the float bracket 71y. Also, as shown in FIG. 14, there may be used a tongue type stopper 71Aya in which a tongue is disposed in the float bracket 71Ay and is bent therein into an integral unit.

The valve seat 15 has a male screw and thus can be fastened to the female screw of the cover 10. Further, between the valve seat 15 and cover 10, there is interposed seal tape, O ring, a seal member or the like in order to prevent the stored drain water from leaking from the inside of the cover 10 to the outside. Also, the inside diameter of the valve seat 15 provides the standard used to select the quantity per time of the drain water to be discharged from the drain trap 1. Specifically, in order to make the drain trap 1 compact, the inside diameter may be small, whereas, in order to discharge iron rust, abrasion powder, or other various foreign substances, the inside diameter may be as large as possible. Consequently, the inside diameter is set about 0.8 to 3.0 mm.

The solid bracket 71, 71A, as shown in FIG. 1, is fixed to the cover 10 by the valve seat 15. The float bracket 71y, 71Ay is situated on the upper portion of the valve seat 15, while the valve body bracket 71x is situated on the lower portion of the valve seat 15. However, the valve bracket 71x and float bracket 71y, 71Ay may not be formed integrally but they may also be formed separately and may be situated at their individual positions of the cover 10. Referring to the position relationship of the valve pivot shaft 72, arm stopper 74, 71Aya and float pivot shaft 73, from the purposes of the opening and closing of the valve seat 15 by the valve body 51 of the valve 50 swingable about the valve pivot shaft 72, arm stopper 74, 71Aya for setting a limit on the operation of the valve pivot shaft 72, and float 20 swingable about the float pivot shaft 73, they may be preferably situated near to the valve seat 15 in this order. Here, with respect to the method for fixing the solid bracket 71, 71A, so long as it is fixed near to the valve seat 15, instead of the method using the valve seat 15, there may also be employed other methods using other members.

Referring to the valve pivot shaft 72, since the valve seat 15 is opened and closed by the valve body 51 constituting part of the valve 50, when the distance between the valve body 51 and valve pivot shaft 72 constituting the end portion of the valve 50 and serving as the center of swing motion of the valve body is set as short as possible, force to move the valve body 51 can be increased, which reaches a conclusion that it is best to set the valve pivot shaft 72 near to the valve seat 15. According to this conclusion, while the float pivot shaft 73 and valve pivot shaft 72 are both situated in the integral brackets 71, 71A, by fixing the solid bracket 71, 71A to the cover 10 using the valve seat 15, the valve pivot shaft 72 is situated near to the valve seat 15.

Here, the valve 50 is constituted of the valve arm 52 with the valve pivot shaft 72 situated in one end thereof and the spring bearing 53 fixed to the other end thereof, and the valve body 51 fixed near to the valve pivot shaft 72 of the valve arm 52 for opening and closing the valve seat 15, while the valve 50 can be swung about the valve pivot shaft 72. On the other hand, the valve body 51 may be a rubber or plastic soft product having, for example, a cylindrical shape or a truncated cone shape, while its surface to be contacted with the valve seat 15 is a plane surface.

Transmission of force to be transmitted from the float 20 for generating buoyancy to the valve 50 for opening and closing the valve seat 15 is attained by using the compression force of the spring 60 including the torsion coil spring 60 connected to the float 20 and valve 50 in the hole 20a and spring bearing 53 portions thereof. Especially, the valve pivot shaft 72, valve 50 having the valve body 51, spring bearing 53, valve arm 52, spring 60 including torsion coil spring 60, float 20 and float pivot shaft 73 are connected together in such a manner that they can be swung and moved integrally. Thus, assuming that a virtual line A connecting the valve pivot shaft 72 to the spring bearing 53 is the boundary, when the hole 20a is situated on the float main body 21 side, the force of the spring 60 including the torsion coil spring 60 is transmitted from the spring bearing 53 to the valve arm 52 to thereby push the valve seat 15 in its closing direction; and, when the hole 20a is situated on the opposite side to the float main body 21, the force of the spring 60 including the torsion coil spring 60 is transmitted from the spring bearing 53 to the valve arm 52 to thereby push the valve seat 15 in its opening direction.

Therefore, in FIGS. 2 to 7, a locus provided by the spring bearing 53 swinging about the valve pivot shaft 72 and a locus provided by the hole 20a swinging about the float pivot shaft 73 are designated by two arcs shown by dotted lines. The respective positions shown on the circles make it possible to solve the problems.

The spring 60, in this embodiment, is described on the assumption that it is the torsion coil spring 60. However, so long as the compressed spring force can be used, there may also be used an ordinary spring, a spring produced by bending a plate spring into a U-like shape, or other springs.

Figure 17:
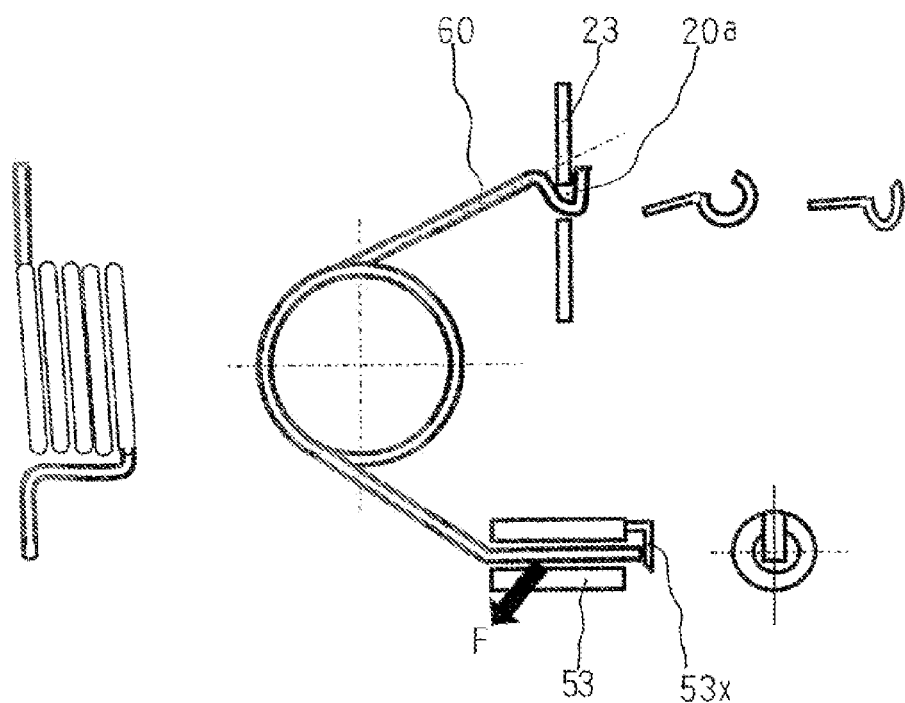
FIG. 17 shows how to prevent the removal of the two end portions of a torsion coil spring.

Further, as shown in FIG. 17, the end portion of the torsion coil spring 60 existing on the side of the hole 20a of the float 20 is formed in a C-like, U-like, or V-like shape, thereby allowing the end portion to be mounted into the hole 20a, and the end portion of the torsion coil spring 60 existing on the side of the spring bearing 53 constituting the valve 50 is formed straight, thereby allowing the end portion to be inserted into the spring bearing 53, whereby the torsion coil spring 60 can connect the float 20 and valve 50 to each other, while allowing them to swing smoothly. However, alternatively, instead of the spring bearing 53, a hole may be formed in the end portion of the valve arm 52 constituting the valve 50, and the valve 50 side end portion of the torsion coil spring 60 may be formed in a C-like, U-like, or V-like shape.

Figure 18:
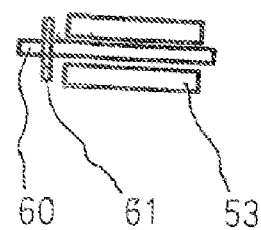
FIG. 18 shows how to prevent the removal of the valve arm side end portion of the torsion coil spring.

Of the thrust direction movement of the torsion coil spring 60 to be inserted into the spring bearing 53, the removal thereof toward the insertion side is prevented by the spring force of the torsion coil spring 60. Also, the removal toward the counter-insertion side is restricted by a tongue-type stopper 53x provided on the end portion of the spring bearing 53, thereby preventing the thrust direction removal of the torsion coil spring 60. In addition, alternatively, the removal toward the insertion side may also be prevented by mounting an E retaining-ring type stopper 61 onto the straight portion of the torsion coil spring 60, as shown in FIG. 18.

On the other hand, the float 20 includes the float main body 21 floating on the drain water stored within the cover 10 and thus movable up and down according to the increase and decrease of the drain water, the float arm 22 positioning the float pivot shaft 73 on one end thereof and fixing the float main body 21 to the other end thereof, the spring arm 23 formed integrally with the float arm 22 from the intermediate portion thereof, and, in a state where the hole 20a capable of connecting the spring 60 including the torsion coil spring 60 to the end portion of the spring arm 23 is formed, a weight 24. The float 20 can be swung about the float pivot shaft 73 and also, with the spring 60 including the torsion coil spring 60 connected thereto, the float 20 can be swung simultaneously with the spring 60.

Here, referring to the float main body 21, a spherical float main body 21 is formed of a thin metal plate and the weight thereof is then adjusted using the weight 24, 24A, or a float main body 21 is formed of formable resin with its foaming magnification adjusted and the weight of the product is then adjusted using the weight 24, 24A; and, a proper float main body 21 is selected from such products with the total weight and the specific gravity and volume involved with the buoyancy taken into consideration. Or, with the total weight, specific gravity and volume taken into consideration, the float main body 21 may also be formed of plastic.

Figure 15:
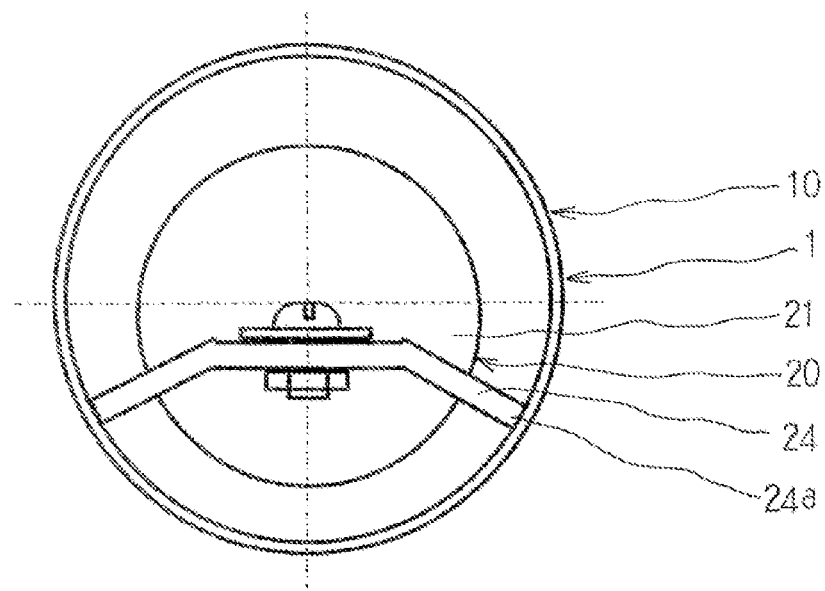
FIG. 15 is a view of a lower limit stopper attached to a weight.
Figure 16:
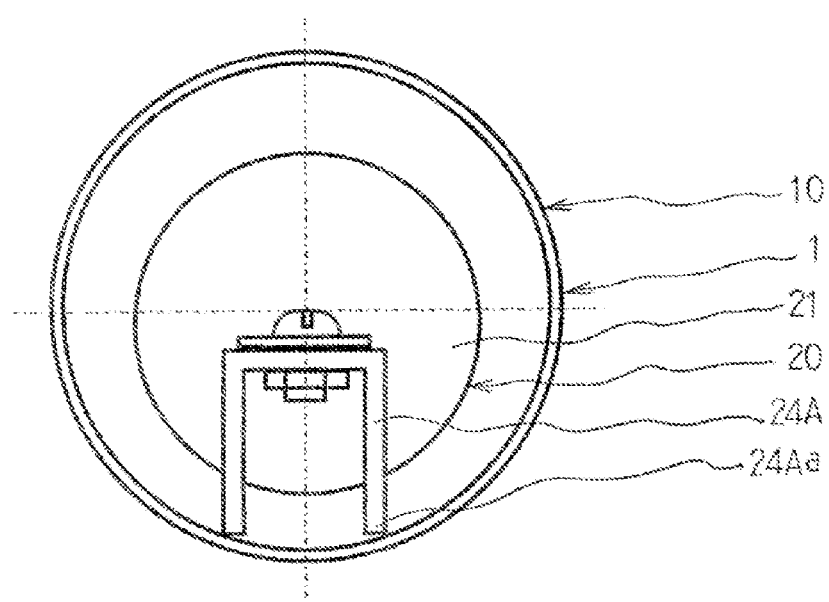
FIG. 16 is a view of a lower limit stopper attached to another weight.

For use together with the weights 24, 24A, as shown in FIGS. 15 and 16, there are provided a lower limit stopper 24a, 24Aa in such a manner that it is contacted with the side surface of the inner wall of the cover 10 or the bottom portion thereof. In this case, although the lower limit stopper 24a, 24Aa is not always necessary, it serves as a safety device when the float 20 is going to lower than the lowest position for some reason. Also, although not shown specifically, an upper limit stopper may also be provided on the upper left portion of the hole 20a shown in FIG. 1 in such a manner that it is contacted with the upper surface of the inner wall of the cover 10.

In this case, one end of the float arm 22 is osillatably connected to the float pivot shaft 73 located on the float bracket 71y and the other end is fixed to the float main body 21 by welding, by brazing, by adhesive, by bolt and nut or other connecting methods so that the float main body 21 can move integrally with the float arm 22. Therefore, the float 20 moves up and down according to the increase and decrease of the drain water stored within the cover 10 while it is swinging about the float pivot shaft 73. Further, the spring arm 23 is united with the float main body 21 from the intermediate portion of the float arm 22 and is fixed thereto by welding or by bolt and nut so that the spring arm 23 can be moved together with the float arm 22 and float main body 21. And, in the leading end of the spring arm 23, there is formed a hole 20a connectable by the spring 60 including the torsion coil spring 60, whereby the spring arm 23 can be swung integrally with the spring 60.

Figure 6:
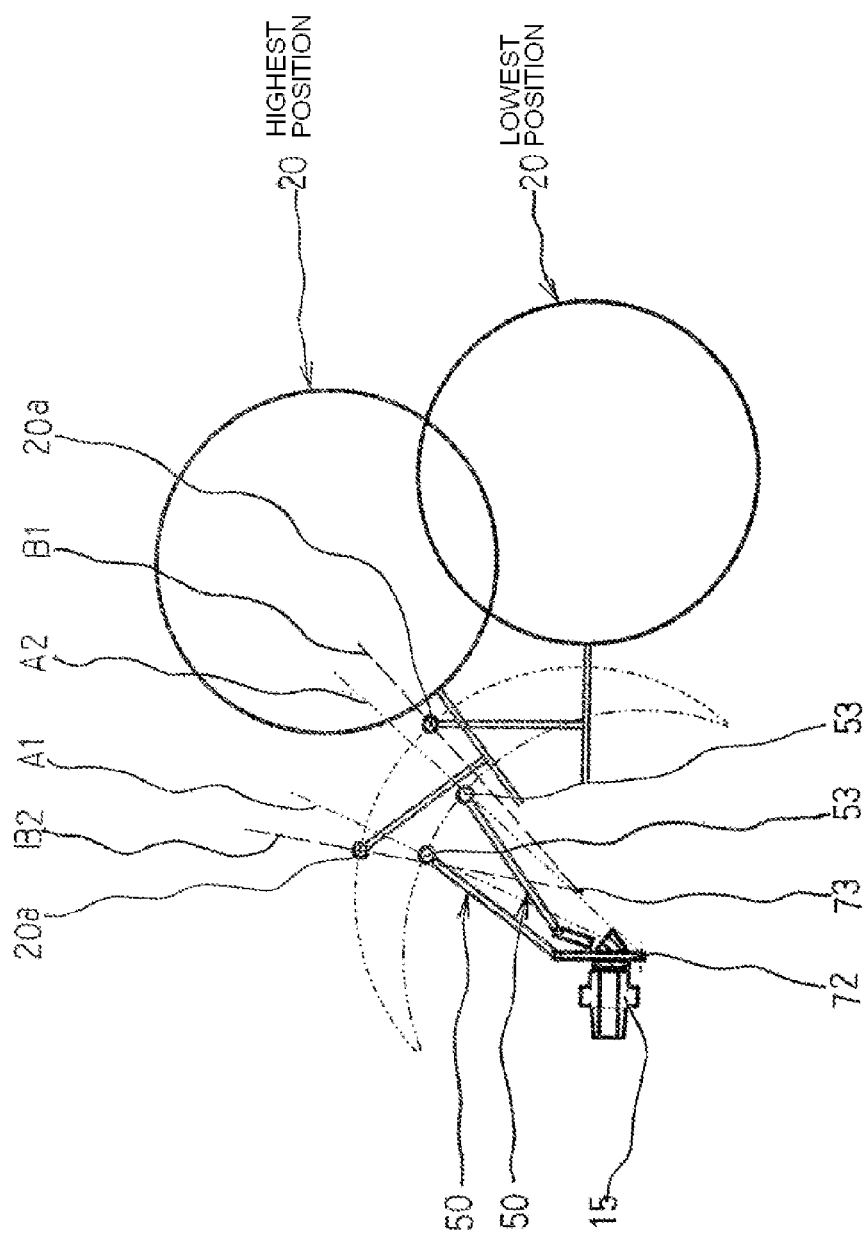
FIG. 6 is an overlapped view in which the state where the valve seat is closed and the float floating water surface shows the highest position is overlapped with the state where the valve seat is opened and the float floating water surface shows the lowest position.

Further, FIG. 6 shows the opened and closed states of the valve seat 15 and the highest and lowest positions, that is, the limit positions of the movement of the float 20, when they are shown on a virtual line A connecting the valve pivot shaft 72 to the spring bearing 53 and on a virtual line B connecting the float pivot shaft 73 to the hole 20a, including the movements of the valve 50 and float 20. And, actually, the valve pivot shaft 72 situated on the virtual line A moves instantly between two positions, namely, a virtual line A1 when the valve seat 15 is closed and a virtual line A2 when the valve seat 15 is opened. Further, while the locus of the movement of the hole 20a formed in the float 20 is shown by an arc, the movement is limited to the range between a virtual line B1 where the float 20 shows the lowest position and a virtual line B2 where the float 20 shows the highest position.

Therefore, as a whole, while the valve body 51 constituting the valve 50 is closing the valve seat 15 and the spring bearing 53 is also standing still on the virtual line A1, the hole 20a formed in the float 20 and existing on the opposite side to the spring 60 including the torsion coil spring 60 connected to the float 20 is caused to move about the float pivot shaft 73 between the virtual lines B1 and B2.

While the valve 15 of the valve body 51 constituting the valve 50 is opened and the spring bearing 53 is also standing still on the virtual line A2, the hole 20a formed in the float 20 and existing on the opposite side to the spring 60 including the torsion coil spring 60 connected to the float 20 is caused to move about the float pivot shaft 73 between the virtual lines B1 and B2.

While the float type drain trap and the method for discharging drain water according to the embodiment are structured in the above-mentioned manner, description is given below of the operations thereof.

Figures 19, 20:
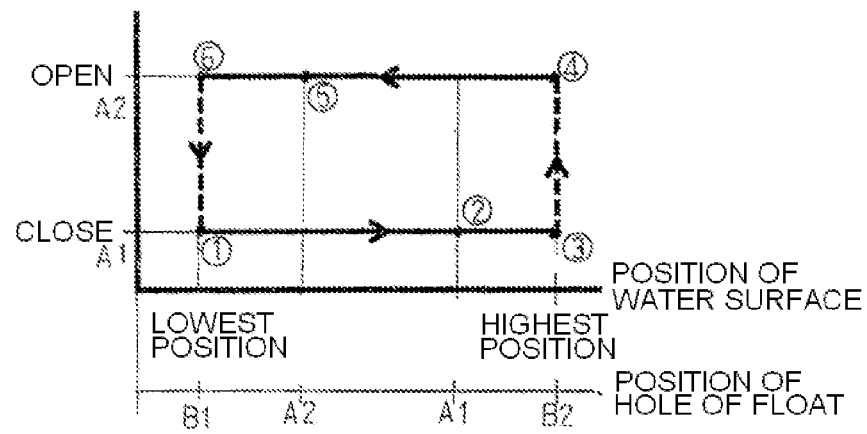
FIG. 19 shows the relationship between the opening and closing position of the valve seat or the position of the spring bearing of a valve and the position of the water surface or the position of a hole formed in the float to be determined by the rising and lowering motion of the float in a float type drain trap.
FIG. 20 shows the relationship between the flow quantity of the drain water and the elapsed time in the float type drain trap.

Firstly, FIG. 19 shows, in the float type drain trap according to the embodiment, the relationship between the opening and closing of the valve seat, or the positions of the spring bearing of the valve and the positions of the water surface or the positions of the hole of the float corresponding to the rise and fall of the float. FIG. 20 shows the relationship between the flow quantity of the drain water and elapsed time in the float type drain trap according to the embodiment. As shown in FIG. 19, the water surface rises and falls according to the flow-in and flow-out of the drain water and the float 20 also rises and falls accordingly, whereas the valve seat 15 only holds the two states, that is, the opened and closed states (more specifically, it holds the opened and closed states instantly).

Here, FIG. 19 shows the relationship between the opening and closing of the valve seat, the positions of the spring bearing of the valve, the positions of the water surface and the positions of the hole 20a of the float 20 according to the rise and fall of the float 20. Thus, as can be seen from FIG. 6, from the viewpoint of the virtual line B connecting the float pivot shaft 73 to the hole 20a, the locus of the hole 20a is set such that it exists on the virtual line B1 when the water surface shows the lowest position, while it exists on the virtual line B2 for the highest position of the water surface. That is, the hole 20a is caused to move between the virtual lines B1 and B2.

A locus formed of two arcs respectively provided by the hole 20a constituting the float 20 and the spring bearing 53 constituting the valve 50 draws a crescent shape. Therefore, when the positions of the spring bearing 53 constituting the valve 50 are overlapped with the locus of the hole 20a and are checked according to the virtual line A connecting the valve pivot shaft 72 to the spring bearing 53, the focus of the spring bearing 53 forms the virtual line A1 when the valve seat 15 is closed; and, when the valve 50 is pushed aside by the arm stopper 74, 71Aya at the moment the valve seat 15 is opened, the focus of the spring bearing 53 forms the virtual line A2. Thus, the spring bearing 53 moves instantly between the two points, that is, the virtual line A1 when the valve seat 15 is closed, and the virtual line A2 when the valve seat 15 is opened. As a result, as can be seen clearly from FIG. 6, the virtual lines A1 and A2 are situated between the virtual lines B1 and B2. Therefore, as the water surface moves from the lowest position to the highest position, the hole 20a stands still on and moves across the virtual lines B1, A2, A1 and B2 in this order. The above contents are shown in FIG. 19.

Figure 2:
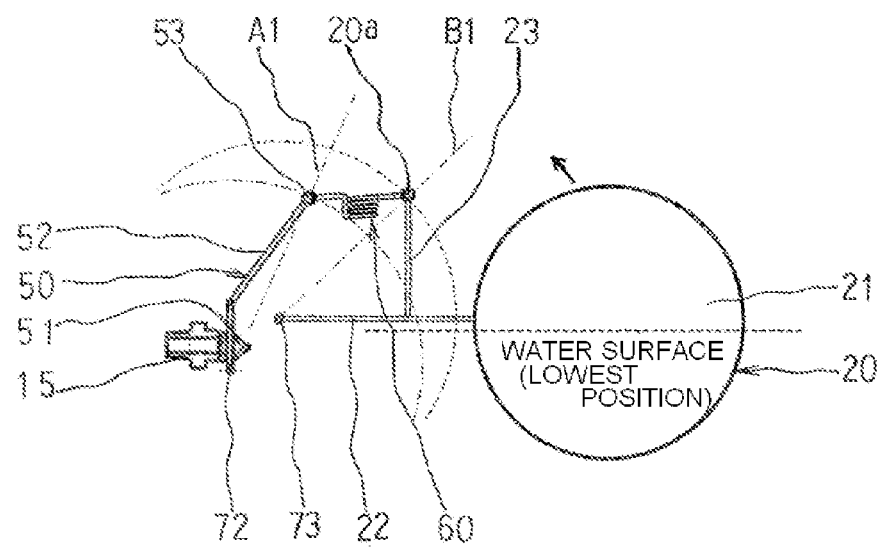
FIG. 2 shows a state just before a water surface with a float floating thereon rises from the lowest position just after a valve seat is closed.

Now, description is given more specifically of the contents with reference to a series of operations. In FIG. 19, in a state (1), the water surface shows the lowest position and, therefore, the float 20 also shows the lowest position, while the hole 20a exists on the virtual line B1 and the valve seat 15 is closed, whereby the virtual line A1 is formed. This state is shown in FIG. 2. And, between the state (1) and the state (3), with the valve 15 closed, the virtual line A1 is formed while the opening/and closing valve 50 is standing still. Thus, the drain water flows in and the water surface rises, thereby causing the float 20 to rise. Here, in a state (2), when viewed only from the direction of the force provided by the spring force of the spring 60 acting on the valve 50, the hole 20a, after it crosses the virtual line A1, exists on the boundary where the valve seat 15 is changed from the closed state to the opened state. However, since other forces are also actually acting on the valve seat 15, the valve seat 15 remains closed.

Figure 3:
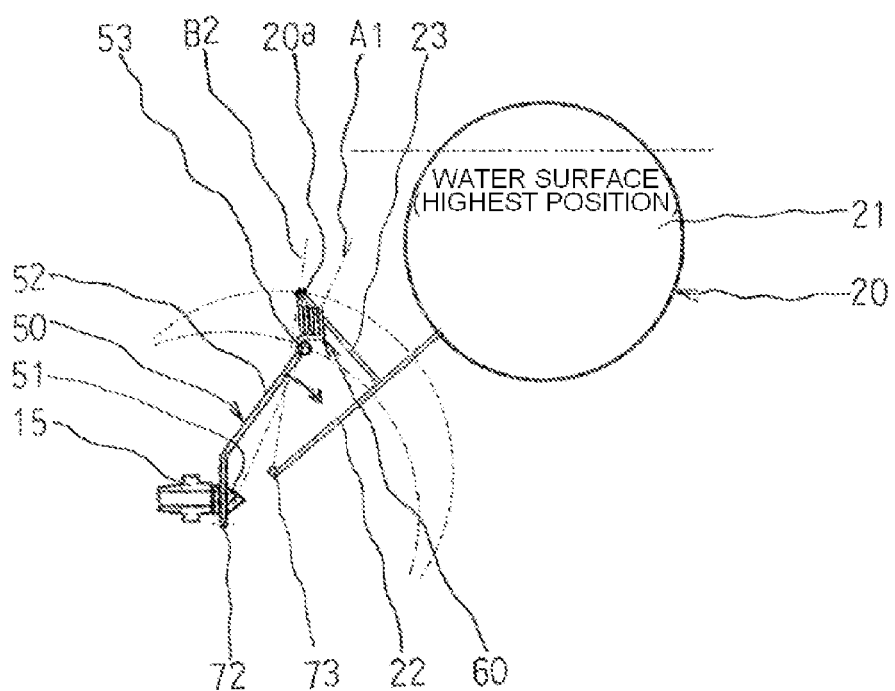
FIG. 3 shows a state where the water surface with the float floating thereon shows the highest position just before the valve seat is opened after closed.

Next, in the state (3), the water surface shows the highest position, therefore, the float 20 also shows the highest position, the hole 20a is situated on the virtual line B2 and the valve seat 15 is closed, whereby the virtual line A1 is formed. This state is shown in FIG. 3. When the state reaches the state (3), the valve seat 15 is opened instantly, whereby the state reaches the state (4).

Figure 4:
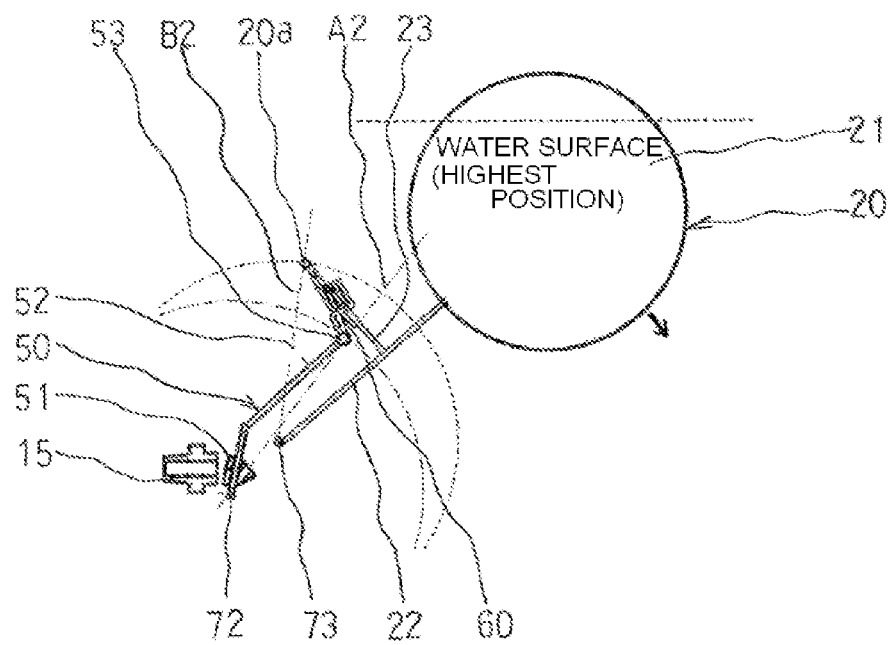
FIG. 4 shows a state just before the water surface with the float floating thereon lowers from the highest position just after the valve seat is opened.

And, in the state (4), the water surface shows the highest position, therefore, the float 20 also shows the highest position, the hole 20a is situated on the virtual line B2 and valve seat 15 is opened, whereby the virtual line A2 is formed. This state is shown in FIG. 4. And, between the state (4) and the state (6), with the valve seat 15 opened, the virtual line A2 is formed while the valve 50 is standing still. Thus, the drain water flows out and the water surface lowers, thereby causing the float 20 to fall. Here, in the state (5), when viewed only from the direction of the force provided by the spring force of the spring 60 acting on the valve 50, the hole 20a, after crossing the virtual line A2, provides the boundary where the valve seat 15 is changed from the opened state to the closed state. However, since other forces are also actually acting on the valve seat 15, the valve seat 15 remains opened.

Figure 5:
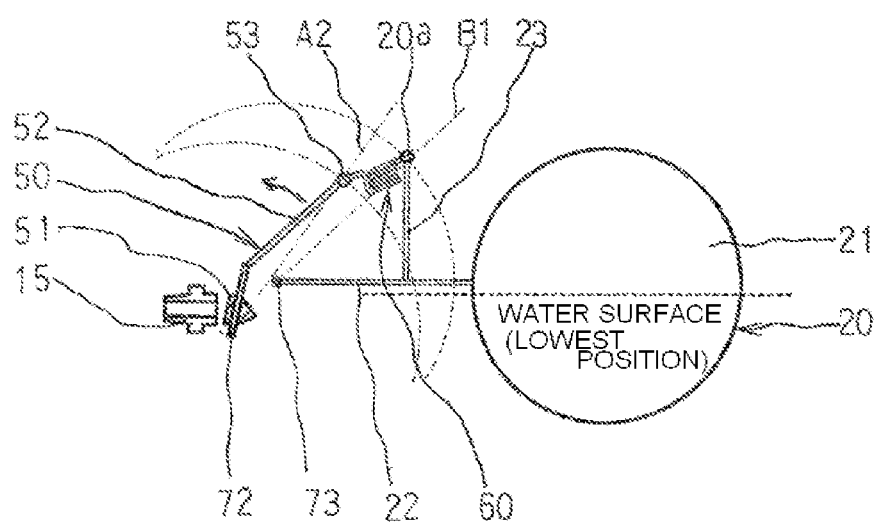
FIG. 5 shows a state where the water surface with the float floating thereon shows the lowest position just before the valve seat is closed after opened.

Finally, in the state (6), the water surface shows the lowest position, therefore, the float 20 also shows the lowest position, the hole 20a is situated on the virtual line B1 and valve seat 15 is opened, whereby the virtual line A2 is formed. This state is shown in FIG. 5. And, the moment that the state reaches the state (6), the valve seat 15 is closed, whereby the state reaches the state (1). In this manner, the operations of the states (1) to (6) are repeated many times.

Due to the connection of the float 20 and valve 50 using the spring 60, as can be seen from FIGS. 19 and 20, while the drain water is flowing in successively, the valve seat 15 can be closed instantly and the closed state can be maintained; and, also when the drain water flows out, the valve seat 15 can be opened instantly and thus the drain water is allowed to flow out intermittently and energetically.

In other words, when FIGS. 2 to 5 are viewed wholly, the virtual line A connecting the valve pivot shaft 72 and spring bearing 53 to each other, consequently, in the illustrated embodiment, is limited to the two portions because the float 20 is caused to move instantly between the virtual lines A1 and A2. Specifically, when, with the virtual line A as the boundary, the hole 20a constituting the float 20 is situated on the float main body 21 side, the force of the spring 60 is transmitted from the spring bearing 53 to the valve arm 52, thereby pushing the valve seat 15 in its closing direction; and, when the hole 20a is situated on the opposite side to the float main body 21, the force of the spring 60 is transmitted from the spring bearing 53 to the valve arm 52, thereby pushing the valve seat 15 in its opening direction. That is, the valve 50 causes the valve seat 15 to be closed or opened instantly. Thus, various kinds of foreign substances contained in the drain water or staying in the drain trap 1 can be discharged easily simultaneously when the drain water is drained.

However, although the position of the virtual line A, in the above description, is limited to the two portions, namely, the virtual lines A1 and A2, in order to open the valve seat 15 half, an intermediate stopper may also be provided in the intermediate portion of the arm stopper 74, 71Aya, and the intermediate stopper may be removed using the pressure existing in the vicinity of the valve seat 15 to thereby move the virtual line to the virtual line A2.

As a result, since the valve seat 15 is opened and closed fully without being half open, as shown in FIG. 20, the drain water, which is always flowing in, can be drained at given intervals.

Further, of the operations of the drain trap 1 carried out according to the increase and decrease of the drain water, description is given of the characteristic operations mainly with reference to the spring force.

Firstly, FIG. 2 shows a state just before the float main body 21 constituting the float 20 rises from the lowest position just after the drain water is discharged and thus the valve seat 15 is closed by the valve body 51 of the valve 50. In this case, this state shows the length of the end portion of the spring 60 transmitting the spring force generated because it is compressed. In other words, it shows the length between the center of the hole 20a constituting the float 20 and the center of the spring bearing 53 constituting the valve 50. The length exists, of the virtual line B connecting the float pivot shaft 73 and hole 20a, on the virtual line B1 determined because the float main body 21 shows the lowest position, and also exists, of the virtual line A connecting the valve pivot shaft 72 and spring bearing 53, on the virtual line A1 determined because the valve seat 15 is closed by the valve 50. Therefore, this state also shows that the length of the end portion of the spring 60 also is such length as can transmit the spring force capable of closing the valve seat 15.

Figures 7, 8:
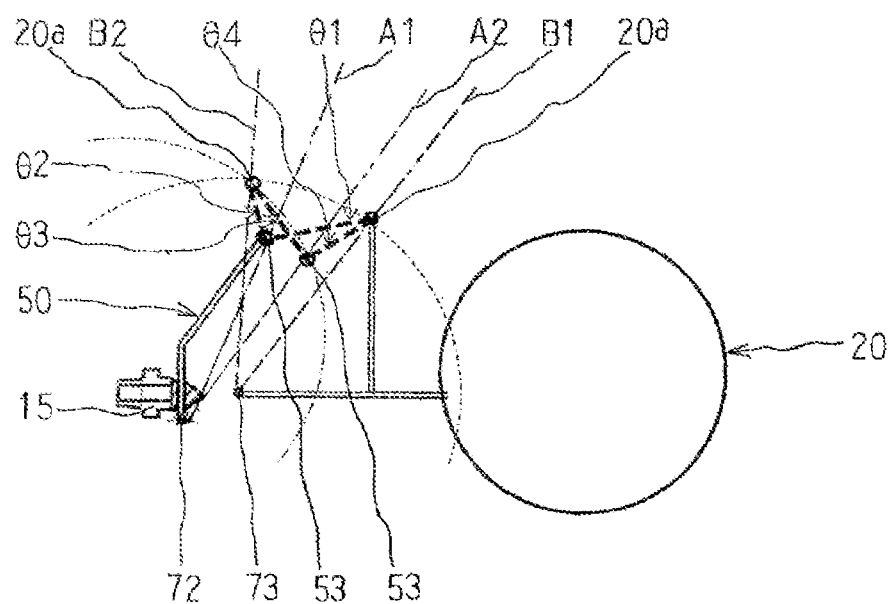
FIG. 7 shows the relationship between the length of the end portion of a torsion coil spring and the winding angle thereof in the limits of the respective swing ranges of the valve and float.
FIG. 8 shows the relationship between the lengths of the end portion of the torsion coil and the winding angles thereof.

And, as shown in FIGS. 7 and 8, assuming that the spring 60 is the torsion coil spring 60, when the states of the torsion coil spring 60 are compared with each other according to four states including the current state and three states to be discussed later, they can be shown by the winding angles of the spring (instead of the length of the end portion of the spring 60 and the length between the hole 20a and spring bearing 53): that is, ⓛ, where the float main body 21 shows the lowest position and the valve seat 15 is closed, shows the smallest winding angle, the smallest compression force (the smallest spring force), and the largest length. The state shown here, as shown in FIG. 19, corresponds to the state (1) where the valve seat 15 is closed and the float main body 21 shows the lowest position.

Figure 11:
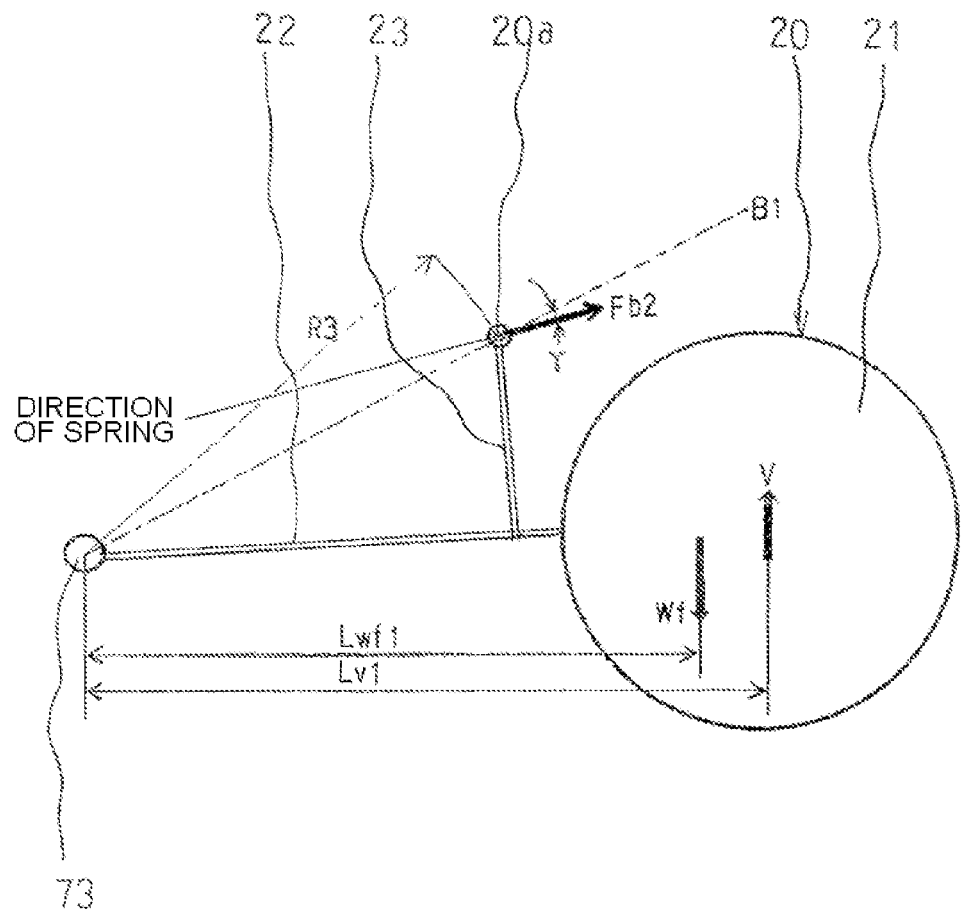
FIG. 11 shows the states of force around the valve pivot shaft just before the float floating water surface rises from the lowest position just after the valve seat is closed.

As shown in FIG. 2, the condition of the force around the float pivot shaft 73, in a state where, just after the valve seat 15 is closed, the water surface with the float main body 21 floating thereon shows the lowest position, is as shown in FIG. 11. In conclusion, when the [numeric equation 1] is satisfied, the float 20 is caused to rise.

$$Wf \cdot Lwf1 + Fb2 \cdot \sin \gamma \cdot R3 < V \cdot Lv1, \text{ where R3: swing radius from float pivot shaft 73 to hole } 20a, [\text{Numeric equation 1}]$$

Lwf1: horizontal distance from float pivot shaft 73 to center of gravity of float 20, Lv1: horizontal distance from float pivot shaft 73 to buoyancy loading point of float 20, V: buoyancy of float 20, Fb2: spring force of spring 60 to be transmitted from hole 20a, Wf: weight of float 20, and γ: angle formed between virtual line B1 connecting line connecting float pivot shaft 73 to hole 20a and line connecting hole 20a to spring bearing 53, respectively serving as two ends of spring 60.

Therefore, when the [numeric equation 1] is satisfied, the hole 20a constituting the float 20 can rise while drawing an arc-shaped locus from the virtual line B1 toward the virtual line B2. In this case, the [numeric equation 1] can also be used in the process where the float 20 is rising. The horizontal distance Lwf1 from the float pivot shaft to the center of gravity of the float and the horizontal distance Lv1 from the float pivot shaft to the buoyancy loading point of the float, in FIG. 11, are shown in a state where the float arm 22 exists horizontally. However, as the float 20 rises, of course, the float arm 22 inclines and thus the above horizontal distances become shorter than when the float arm 22 extends horizontally, whereby, of course, the spring force Fb2 to be transmitted from the hole and the angle γ formed between the virtual line connecting the float pivot shaft to the hole and the two ends of the spring are caused to vary. In conclusion, it is important to reduce the weight Wf of the float or weaken the spring force Fb2 of the spring to be transmitted from the hole.

From now on, the drain water flows in to cause the water surface to rise, thereby pushing up the float 20. In this case, as shown in FIG. 2, the float 20 rises while drawing an arc about the float pivot shaft 73, thus the hole 20a formed in the leading end of the spring arm 23 constituting the float 20 rises while drawing an arc about the float pivot shaft 73 from the virtual line B1 to the virtual line B2, the buoyancy of the float 20 compresses the spring 60, and the spring force provided by the compressed spring pushes the valve 50 in its closing direction up to a certain point through the spring bearing 53 situated on the leading end of the spring arm 52 constituting the valve 50. On the other hand, although the valve 50 pushed by the spring force moves while drawing an arc about the valve pivot shaft 72 and is further going to move beyond the virtual line A1, due to the existence of the valve seat 15 fixed to the cover 10, the valve body 51 constituting the valve 50 only pushes the valve seat 15, whereby the valve seat 15 is left closed. Therefore, while the drain water is flowing in and the water surface is rising from the lowest position to the highest position, the valve seat 15 remains closed. During this time, the valve 50 is standing still and only the hole 20*a* formed in the float 20 is allowed to move.

Here, in the process where the water surface rises, while the hole 20*a* constituting the float 20 is moving with the valve seat 15 remaining closed, as shown in FIG. 2, there always exists the time when the hole 20*a* crosses the virtual line A1. In this case, although no change can be seen from the outside, the spring force generated due to the spring compressed by the buoyancy of the float 20 is transmitted to the valve 50, whereby the valve 50 is caused to turn its shape to close the valve seat 15 to its shape to open the valve seat 15. However, just after the hole 20*a* passes the virtual line A1, due to the relationship between various forces, actually, the valve seat 15 cannot be opened. The state shown here, as can be seen in FIG. 19, corresponds the state (2) where the valve seat 15 maintains its closed shape.

Next, FIG. 3 shows a state where the float main body 21 constituting the float 20 rises up to the highest position, the valve seat 15 is left closed by the valve body 51 of the valve 50 and, after then, just before the valve 50 is instantly pushed aside and is opened. In this case, the above state shows the length of the end portion of the spring 60. In other words, it shows the length between the centers of the hole 20*a* and spring bearing 53 when they exist, of the virtual line B, on the virtual line B2 determined because the float main body 21 shows the highest position and exist, of the virtual line A, on the virtual line A1 determined because of the valve seat 15 being closed. Therefore, the length of the end portion of the spring 60 shows the length that can transmit spring force capable of closing the valve seat 15.

Here, as shown in FIGS. 7 and 8, assuming that the spring 60 is the torsion coil spring 60, when the states of the torsion coil spring 60 are compared with each other according to the four states, they can be shown by the winding angles of the spring (instead of the length of the end portion of the spring 60 and the length between the hole 20*a* and spring bearing 53): that is, θ2, where the float main body 21 exists at the highest position and the valve seat 15 is closed, shows the largest winding angle, the greatest compression force (the greatest spring force) and the smallest length. The state shown here, as shown in FIG. 19, corresponds to the state (3) where the valve seat 15 is closed and the float main body 21 shows the highest position.

Figure 9:
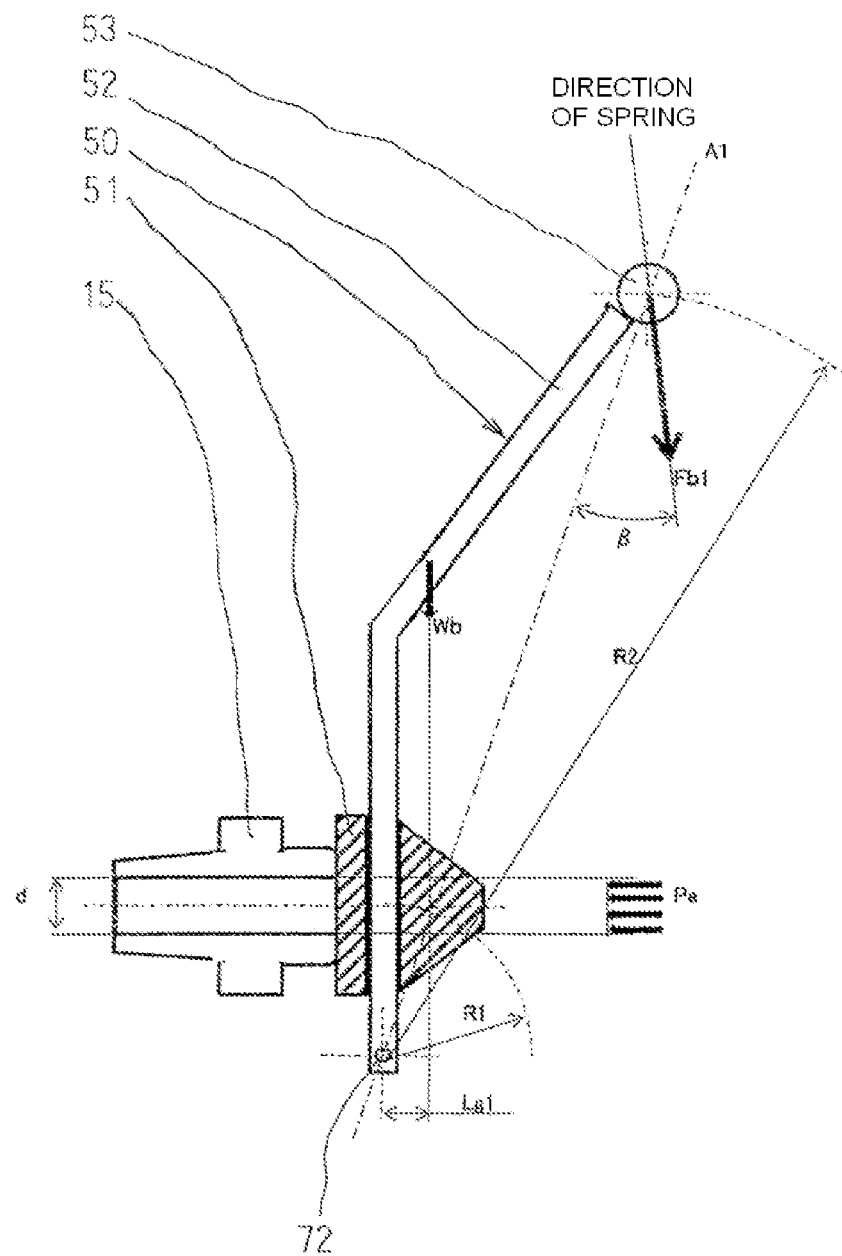
FIG. 9 shows the states of force around a valve pivot shaft in a state where the float floating water surface shows the highest position just before the valve seat is opened after closed.

Here, as shown in FIG. 3, the state of the force around the valve pivot shaft 72 when the water surface with the float main body 21 floating thereon shows the highest position just before the valve seat 15 is opened after closed is as shown in FIG. 9. In conclusion, by satisfying a numeric equation 2, the valve 50 can open the valve seat 15.

$$(\pi d^2/4) \cdot Pa \cdot R1 - Wb \cdot Lg1 < Fb1 \cdot \sin \beta \cdot R2, \text{ where } R1:$$
swing radius from valve pivot shaft 72 to center of valve seat 15, [Numeric equation 2]

R2: swing radius from valve pivot shaft 72 to spring bearing 53,

Lg1: horizontal distance from valve pivot shaft 72 to center of gravity of valve 50, d: inside diameter of valve seat 15, Fb1: spring force of spring 60 to be transmitted from spring bearing 53, Wb: weight of valve 50, Pa: compressed air pressure (inner pressure of system), and, β: angle formed between virtual line A1 connecting valve pivot shaft 72 to spring bearing 53 and line connecting hole 20*a* to spring bearing 53, respectively serving as two ends of spring 60.

Therefore, to satisfy the numeric equation 2, there is necessary a larger spring force Fb1 to be transmitted from the spring bearing which can correspond to the compressed air pressure Pa. In other words, as has been described heretofore, there is necessary the buoyancy V of the float that corresponds to the larger spring force Fb1 to be transmitted from a large spring bearing. And, the moment the numeric equation 2 is satisfied, that is, the moment the hole 20*a* formed in the float 20 reaches the virtual line B2, the valve seat 15 is opened and the valve 50 is pushed aside by the arm stopper 74 while moving about the valve pivot shaft 72, when the virtual line A moves from the virtual line A1 to the virtual line A2 instantly. Here, the numeric equation 2, in a state where the valve seat 15 is closed, can be used with reference to the states (1) to (3) shown in FIG. 19. Of course, the value of the spring force Fb1 to be transmitted from the spring bearing and the value of the angle β to be formed between the virtual line connecting the valve pivot shaft to the spring bearing and the two ends of the spring must be set with their respective positions taken into consideration. Under these conditions, in the state (2) shown in FIG. 19, the angle β to be formed between the virtual line connecting the valve pivot shaft to the spring bearing and the two ends of the spring is "0" and thus sin β is also "0". Therefore, of course, the numeric equation 2 cannot be satisfied.

Further, FIG. 4 shows a state just before the float main body 21 constituting the float 20 lowers from the highest position, that is, a state in which, just after the drain water flows in and the float main body 21 reaches the highest position, the valve body 51 of the valve 50 moves instantly and thus the valve 50 is pushed aside by the arm stopper 74 while moving about the valve pivot shaft 72; and thus, a state just after the valve seat 15 is opened. This state shows the length of the end portion of the spring 60. In other words, this state shows the length between the centers of the hole 20*a* and spring bearing 53. The length exists, of the virtual line B, on the virtual line B2 determined because the float main body 21 shows the highest position and also exists, of the virtual line A, on the virtual line A2 determined because the valve seat 15 is opened. Therefore, this state shows that the length of the end portion of the spring 60 is also a length capable of transmitting such spring force as can open the valve seat 15.

As shown in FIGS. 7 and 8, assuming that the spring coil 60 is the torsion spring coil 60, when the current state of the torsion coil spring 60 is compared according to the four states, the state can be shown by the winding angle of the spring (instead of the length of the end portion of the spring 60 and the length between the hole 20*a* and spring bearing 53). Specifically, an angle θ3, where the float main body 21 shows the highest position and the valve seat 15 is opened, shows the second smallest winding angle, the second smallest compression force (second smallest spring force) and the second largest length. Here, this state, as shown in FIG. 19, corresponds to the state (4) where the valve seat 15 is opened and the float main body 21 shows the highest position.

Figure 12:
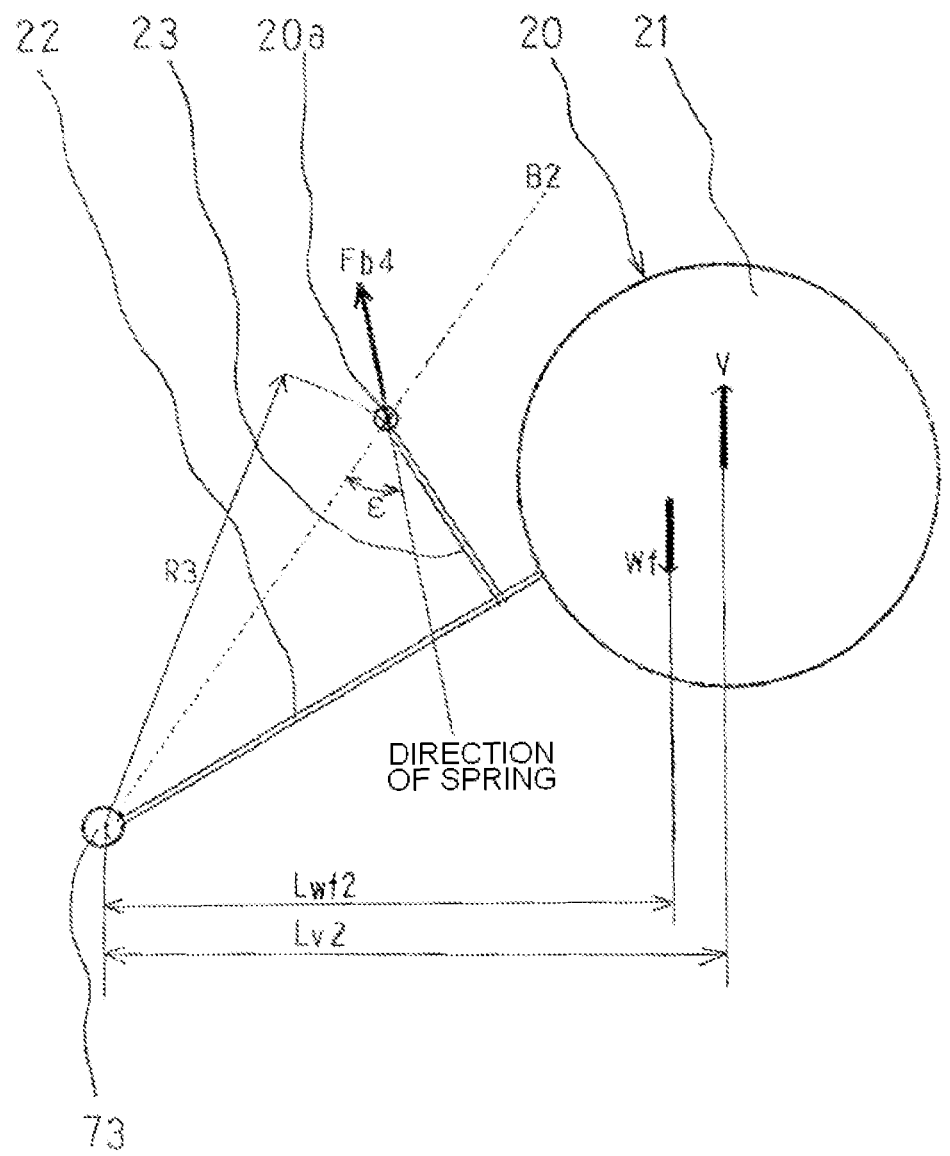
FIG. 12 shows the states of the force around the valve pivot shaft just before the float floating water surface lowers from the highest position just after the valve seat is opened.

Here, as shown in FIG. 4, in a state where, just after the valve seat is opened, the water surface with the float main body 21 floating thereon shows the highest position, the state of the force around the float pivot shaft 73 is as shown in FIG. 12. In conclusion, when "the numeric equation 3" is satisfied, the float 20 is allowed to lower.

$$Wf \cdot Lwf2 - V \cdot Lv2 > Fb4 \cdot \sin \varepsilon \cdot R3, \text{ where } R3: \text{ swing}$$
radius from float pivot shaft 73 to hole 20*a* [Numeric equation 3]

Lwf2: horizontal distance from float pivot shaft 73 to center of gravity of float 20

Lv2: horizontal distance from float pivot shaft 73 to buoyancy loading point of float 20

V: buoyancy of float 20

Fb4: spring force of spring 60 to be transmitted from hole 20a

Wf: weight of float 20

ε: angle formed between virtual line B1 connecting float pivot shaft 73 to hole 20a and line connecting hole 20a to spring bearing 53 respectively serving as two ends of spring 60.

Therefore, when the "numeric equation 3" is satisfied, the hole 20a constituting the float 20 is able to lower from the virtual line B2 toward the virtual line B1 while drawing the locus of an arc. In this case, the "numeric equation 3" can also be used in the intermediate process where the float 20 is lowering and, of course, the spring force Fb4 to be transmitted from the hole and the angle ε, which is formed between virtual line connecting float pivot shaft to the hole and line connecting the two ends of the spring to each other, are also allowed to vary. In conclusion, it is important to increase the weight Wf of the float or weaken the spring force Fb4 to be transmitted from the hole.

Next, as the drain water flows out, the water surface lowers to thereby lower the float 20. In this case, as shown in FIG. 4, the float 20 lowers while drawing an arc about the float pivot shaft 73 and thus the hole 20a formed in the leading end of the spring arm 23 constituting the float 20 also lowers from the virtual line B2 to the virtual line B1 while drawing an arc about the float pivot shaft 73; and, the buoyancy of the float 20 compresses the spring 60 and the spring force generated due to the compression of the spring pushes the valve 50 in its opening direction through the spring bearing 53 situated on the leading end of the spring arm 52 constituting the valve 50 to a certain point. On the other hand, the valve 50 pushed by the spring force is further going to move beyond the virtual line A2 while drawing an arc about the valve pivot shaft 72; however, due to the existence of the arm stopper 74 fixed to the cover 10, the valve 50 is prevented from moving any further and thus the valve seat 15 is left opened. Therefore, during the time while, as the drain water is being discharged, the water surface is lowering from the highest position to the lowest position, the valve seat 15 remains opened.

Here, in the process where the water surface is lowering, while the hole 20a constituting the float 20 is moving with the valve seat 15 remaining opened, as shown in FIG. 4, there always exists the time when the hole 20a crosses the virtual line A2. In this case, although no change can be seen from the outside, when the spring force generated from the spring compressed by the buoyancy of the float 20 is transmitted to the valve 50, it changes from the state to open the valve seat 15 to the state to close the valve seat. However, just after the hole 20a passes the virtual line A2, due to the relationship between various forces existing, actually, the valve seat 15 cannot be closed. Thus, this state, as shown in FIG. 19, corresponds to the state (5) where the valve seat 15 is maintaining its opened state.

Finally, FIG. 5 shows, after the float main body 21 constituting the float 20 lowers down to the lowest position and the valve seat 15 is left opened by the valve body 51 of the valve 50, a state just before the valve 50 is pushed aside and closed instantly. This state shows the length of the end portions of the spring 60, in other words, the distance between the centers of the hole 20a and spring bearing 53. Specifically, the distance exists, of the virtual line B, on the virtual line B1 determined because the float main body 21 shows the lowest position and also exists, of the virtual line A, on the virtual line A2 because the valve seat 15 is opened. Therefore, this state shows that the length of the end portion of the spring 60 is also a length capable of transmitting such spring force as can open the valve seat 15.

In FIGS. 7 and 8, assuming that the spring 60 is the torsion coil spring 60, when the states thereof are compared according to the four states. The state can be shown by the winding angle of the spring (instead of the length of the end portion of the spring 60 and the distance between the hole 20a and spring bearing 53). An angle θ4, where the float main body 21 shows the lowest position and the valve seat 15 is opened, shows the second largest winding angle, the second greatest compression force (the second greatest spring force) and the second smallest length. Here, this state, as shown in FIG. 19, corresponds to the state (6) where the valve seat 15 is opened and the float main body 21 shows the lowest position.

Figure 10:
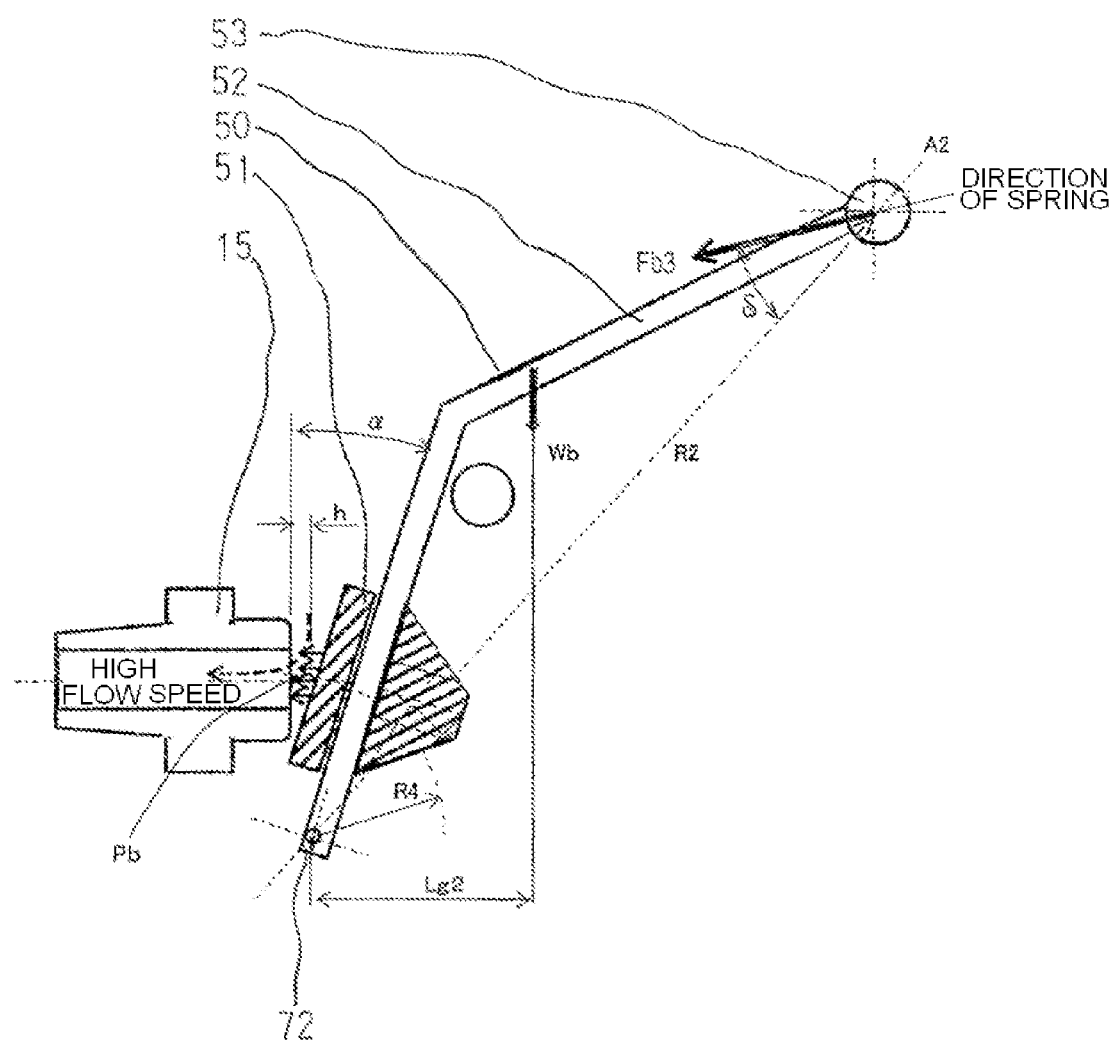
FIG. 10 shows the states of the force around the valve pivot shaft in a state where the float floating water surface shows the lowest position just before the valve seat is closed after opened.

Here, as shown in FIG. 5, in a state just before the opened valve seat 15 is closed and where the water surface with the float main body 21 floating thereon shows the lowest position, the state of the force around the valve pivot shaft 72 is as shown in FIG. 10. In conclusion, by satisfying the "numeric equation 4", the valve 50 is able to close the valve seat 15.

$$Wb \cdot Lg2 < Fb3 \cdot \sin \delta \cdot R2 + (\pi d^2/4) \cdot Pb \cdot R4, \text{ where}$$ [Numeric equation 4]

R2: swing radius from valve pivot shaft 72 to spring bearing 53,

R4: swing radius from valve pivot shaft 72 to loading point of negative pressure of flow speed component, Lg2: horizontal distance from valve pivot shaft 72 to center of gravity of valve 50, d: inside diameter of valve seat 15, Fb3: spring force of spring 60 to be transmitted from spring bearing 53, Wb: weight of valve 50, and Pb: negative pressure of flow speed component generated when Bernoulli's theorem is applied to state where compressed air pressure discharges drain water quickly by opening opening/closing 50, and δ: angle formed between virtual line A2 connecting valve pivot shaft 72 to spring bearing 53 and line connecting hole 20a to spring bearing 53 used as two ends of spring 60.

Therefore, the moment the "numeric equation 5" is satisfied, the valve 50 is pushed aside by the spring force of the spring 60 until the valve body 51 is butted against the valve seat 15, whereby the valve 50 is instantly moved from the virtual line A2 to the virtual line A1. That is, the moment the hole 20a formed in the float 20 reaches the virtual line B2, the valve seat 15 is opened and the valve 50 is pushed aside the arm slopper 74 instantly while swinging about the valve pivot shaft 72. Here, the [numeric equation 4], in a state where the valve seat 15 is opened, can be used for the states (4) to (6) shown in FIG. 19. Of course, the spring force Fb3 to be transmitted from the spring bearing and the angle δ to be formed between the virtual line connecting the valve pivot shaft to the spring bearing and the line connecting the two ends of the spring to each other must be set with the respective positions taken into consideration. Thus, in the case of the position of the state (5) in FIG. 19, the angle δ to be formed by the virtual line connecting the valve pivot shaft to the spring bearing and the line connecting the two ends of the spring to each other is [0071] and thus sin δ is also [0072], so that, naturally, the [numeric equation 4] cannot be satisfied.

Finally, to sum up the relationship between the above-mentioned winding angles including other aspects, as shown in FIGS. 7 and 8, while the float 20 is rising with the valve seat 15 closed, since the compressed air pushes the valve body 51 and the valve seat 15 is thereby closed, no spring force is necessary and thus the winding angle θ1 may preferably be small. And, the state which needs the spring force most is the state of the winding angle θ2 where the valve 50 is going to open from the closed state.

Here, as can be clearly understood from the [numeric equation 3], when the float 20 lowers, the difference between the lowering moment provided by the weight Wf of the float and the lifting moment by the buoyance V of the float must overcome the spring force Fb4 to be transmitted from the hole. That is, the spring force Fb4 to be transmitted from the hole may preferably be small. However, since the link structure includes many connected portions, the winding angle θ4 of the torsion coil spring 60 cannot but become large. Thus, the link structure must be constructed in such a manner that the winding angle θ4 of the torsion coil spring 60 can be made as small as possible. Further, when the [numeric equation 3] cannot be satisfied, it is necessary to increase the weight 24, 24A which is added to the weight Wf of the float.

To sum up the above, it is necessary that the winding angle θ2 is larger than the winding angle θ4. To realize this, the valve pivot shaft 72 serving as the swinging center of the spring bearing 53 constituting the valve 50 is situated nearer to the valve seat than the float pivot shaft 73 serving as the swinging center of the hole 20a formed in the float 20, whereby as the hole 20a approaches the virtual line B1, the distance between the arcs increases. Further, in connection with this, there are available the following two cases: that is, in one case, while the valve 50 is closed and the float 20 is rising due to the flow-in of the drain water, the float 20 crosses the virtual line A1 connecting the valve pivot shaft 72 to the spring bearing 53; and, in the other case, while the valve 50 is opened and the float 20 is lowering due to the flow-out of the drain water, the float 20 crosses the virtual line A2. When the two cases are compared with each other, the case where the float crosses the virtual line A1 while rising is shorter in time than the case where the float crosses the virtual line A2 while lowering.

According to an embodiment, in a float type drain trap, a gas-liquid mixture of compressed air and drain water generated from the compressed air is received from a flow-in opening 10a and the drain water separated from the gas-liquid mixture is discharged from a discharge opening 10b. The float type drain trap is provided with a float 20, an valve 50, and a spring 60. The float 20 and the valve 50 are connected to each other by the spring 60. The spring 60 is compressed by a buoyancy of the float 20. A valve seat 15 is opened and closed by a force of the compressed spring 60 so as to intermittently discharge the drain water from the discharge opening 10b. According to the above structure, especially, since the float and valve body are indirectly connected to each other by the spring, they are prevented from doing the same movement but are caused to move individually. And, due to effective use of the compression force of the same spring both in both directions to open and close the valve, finally, when the drain water is discharged, the valve can be always prevented from being half open with a simple structure. Also, by using the spring instead of the magnets, even when foreign substances mainly including iron flow in, there is eliminated the problem that they are attracted to the magnets, whereby the drain water can be discharged smoothly.

The spring 60 may be configured to move the valve 50 instantly between two positions for respectively opening and closing the valve seat 15, and to keep the valve 50 in stationary conditions at the two positions even while the float 20 rises and falls. According to this structure, by using a single spring for the purpose of the connection and also by making effective use of the characteristics of the spring, the valve seat can be opened and closed by repeating a simple operation. Also, since the valve is prevented from being opened half when discharging the drain water and also the spring is used instead of the magnets, even when substances mainly including iron flow in, there is eliminated the problem that they are attracted to the magnets, whereby the drain water can be discharged smoothly.

The spring 60 may be a torsion coil spring 60. According to this structure, when compared with a float type drain trap in which a valve is operated directly using the buoyancy of a float, a float type drain trap in which the buoyancy of a float operates a spring or the like and a valve is operated indirectly by the spring or the like provides poor transmission efficiency due to a link and the like included therein and thus the float is liable to be large in size. However, in the embodiment, while increasing the movable range of the spring without increasing the size of the float, the force of the spring can be secured.

The float 20 may swing about a float pivot shaft 73 as a water surface of the drain water rises and falls. The valve 50 may swing about a valve pivot shaft 72 between the valve seat 15 and an arm stopper 74, 74Aya. The connecting portions of two ends of the spring 60 may be a hole 20a formed on the float 20 side and a spring bearing 53 provided on the valve 50 side. According to this structure, with respect to the swing motions of the float and valve and the connection of the spring, the whole drain trap can be constructed with a simple structure, whereby the valve seat can be opened and closed while it is prevented from being half open.

The force of the spring 60 may be transmitted from the spring bearing 53 to a valve arm 52 so as to push the valve seat 15 in a closing direction, in a condition where the hole 20a positions on a side of a float main body 21 with respect to a virtual line A connecting the valve pivot shaft 72 and the spring bearing 53. According to this structure, due to effective use of the characteristics of the spring, the operation to close the valve seat can be attained with a simple structure, whereby, when discharging the drain water, the valve seat can be prevented from being half open.

The force of the spring 60 may be transmitted from the spring bearing 53 to the valve arm 52 so as to push the valve seat 15 in an opening direction, in a condition where the hole 20a positions on an opposite side of a float main body 21 with respect to a virtual line A connecting the valve pivot shaft 72 and the spring bearing 53. According to this structure, due to effective use of the characteristics of the spring, the operation to open the valve seat can be attained with a simple structure, whereby, when discharging the drain water, the valve seat can be prevented from being half open.

The float 20 may include a float arm 22, a float main body 21 fixed to one end of the float arm 22, the float pivot shaft 73 disposed on the other end of the float arm 22, and a spring arm 23 fixed to the float arm 22. The hole 20a may be formed in an end portion of the spring arm 23 existing on an opposite side to the float arm 22. The valve 50 may include a valve arm 52, wherein the valve pivot shaft 72 is disposed on one end of the valve arm 52 and the spring bearing 53 is fixed to the other end of the valve arm 52, and a valve body 51 fixed on the valve arm 52 in a vicinity of the valve pivot shaft 72 and configured to open and close the valve seat 15. According to this structure, due to effective use of the characteristics of the spring and also due to the above-described structures of the float and valve, the opening and closing of the valve seat with no half-open state and the compact structure of the drain trap can be realized.

A distance between the hole 20a and the spring bearing 53 in a first situation where the float 20 positions in the highest position and the valve 50 is closed may be shorter than a distance between the hole 20a and the spring bearing 53 in a second situation where the float 20 positions in the lowest position and the valve 50 is opened, such that a length between the two ends of the spring 60 is small and the force of the compressed spring 60 is large in the first situation and the length between the two ends of the spring 60 is large and the force of the compressed spring 60 is small in the second situation. According to this structure, due to effective use of the characteristics of the spring and also due to effective use of the characteristics of the loci of the valve and float respectively about the valve pivot shaft and float pivot shaft, the opening and closing of the valve seat with no half-open state and the compact structure of the drain trap can be realized.

The float pivot shaft 73 may be disposed on a float bracket 71y, 71Ay which is located on an upper side of the valve seat 15. The valve pivot shaft 72 may be disposed on a valve body bracket 71x which is located on a lower side of the valve seat 15. The valve pivot shaft 72 may be positioned closer to the valve seat 15 than the float pivot shaft 73. The float bracket 71y, 71Ay and the valve body bracket 71x may be united together as an one-piece bracket 71, 71A. According to this structure, due to effective use of the characteristics of the spring, and also since close circular orbits can be drawn with a simple structure, the length of the end portion of the spring can be set easily into a necessary length.

One end of the spring 60 at a side of the hole 20a may be formed in a C shape, a U shape or a V shape and may be mounted into the hole 20a of the float 20. The other end of the spring 60 at a side of the spring bearing 53 may be formed in a straight shape so as to be inserted into a bearing hole of the spring bearing 53. According to this structure, the thus structured end portion can facilitate the connection using the spring.

Moreover, in accordance with the embodiments, as shown in the figures, a float type drain trap is provided with a cover 10, a flow-in opening 10a formed on the cover 10, a discharge opening 10b formed on the cover 10, a float pivot shaft 73 extending in a first direction, a first arm 22, 23 swingable about the float pivot shaft 73 and having a first base end connected to the float pivot shaft 73 and a first leading end 20a which is opposite to the first base end, a float main body 21 attached to the first arm 22 and movable in a second direction perpendicular to the first direction in accordance with an amount of drain water in the cover 10, a valve pivot shaft 72 extending in the first direction, a second arm 52 swingable about the valve pivot shaft 72 and having a second base end connected to the valve pivot shaft 72 and a second leading end 53 which is opposite to the second base end, a valve seat 15 connected to the discharge opening 10b, a valve body 51 provided on the second arm 52 and adapted to contact to and separated from the valve seat 15, and a spring 60 to connect the first leading end 20a and the second leading end 53 to each other. The first arm 22,23 and the second arm 52 are movable between a first position and a second position, wherein the first leading end 20a positions in a first side of a third direction which is perpenducular to both the first direction and the second direction with respect to the second leading end 53 in the first position, and the first leading end 20a positions in a second side which is opposite to the first side in the third direction with respect to the second leading end 53 in the second position. The valve body 51 is contact to the valve seat 15 in the first position, and the valve body 51 is separated from the valve seat 15 in the second position.

In the float type drain trap, the spring 60 may be a torsion coil spring 60. A side of the torsion coil spring which directs in one side of the second direction in the first position directs in the other side of the second direction in the second position. That is, when the first arm 22,23 and the second arm 52 move between the first position and the second position, the torsion coil spring is reversed with respect to the second direction.

Description of Reference Numerals and Signs

1: drain trap
10: cover
10a: flow-in opening
10b: discharge opening
11: first cover
12: second cover
13: O ring
14: blank plug
15: valve seat
20: float
20a: hole
21: float main body
22: float arm
23: spring arm
24: weight
24A: weight
24Aa: lower limit stopper
24a: lower limit stopper
50: valve
51: valve body
52: valve arm
53: spring bearing
53x: tongue type stopper
60: spring (torsion coil spring)
61: E retaining-ring type stopper
70: bracket
70A: bracket
71: solid bracket
71A: solid bracket
71Ay: float bracket
71Aya: arm stopper
71x: valve body bracket
71y: float bracket
72: valve pivot shaft
73: float pivot shaft
74: arm stopper
A1: virtual line
A2: virtual line
B1: virtual line
B2: virtual line
d: inside diameter of valve seat
Fb1: spring force to be transmitted from spring bearing
Fb2: spring force to be transmitted from hole
Fb3: spring force to be transmitted from spring bearing
Fb4: spring force to be transmitted from hole
Lg1: horizontal distance from valve pivot shaft to center of gravity of valve
Lg2: horizontal distance from valve pivot shaft to center of gravity of valve
Lv1: horizontal distance from float pivot shaft to buoyancy loading point of float
Lv2: horizontal distance from float pivot shaft to buoyancy loading point of float
Lwf1: horizontal distance from float pivot shaft to center of gravity of float
Lwf2: horizontal distance from float pivot shaft to center of gravity of float
Pa: compressed air pressure
Pb: negative pressure of flow speed component generated when Bernoulli theorem is applied to state where valve is opened to thereby cause compressed air pressure to discharge drain water quickly R1: swing radius from valve pivot shaft to center of valve seat
R2: swing radius from valve pivot shaft to spring bearing
R3: swing radius from float pivot shaft to hole
R4: swing radius from valve pivot shaft to loading point of negative pressure of flow speed component
V: buoyancy of float
Wb: weight of valve
Wf: weight of float
β: angle to be formed between virtual line connecting valve pivot shaft to spring bearing and line connecting two ends of spring to each other
γ: angle to be formed between virtual line connecting float pivot shaft to hole and line connecting two ends of spring to each other
δ: angle to be formed between virtual line connecting valve pivot shaft to spring bearing and line connecting two ends of spring to each other
ε: angle to be formed between virtual line connecting float pivot shaft to hole and line connecting two ends of spring to each other
θ1: winding angle
θ2: winding angle
θ3: winding angle
θ4: winding angle

What is claimed is:

1. A float type drain trap, in which a gas-liquid mixture of compressed air and drain water generated from the compressed air is received from a flow-in opening formed in an upper portion of a cover, the drain water is separated from the gas-liquid mixture, and the drain water is discharged from a discharge opening formed in a lower portion of a side wall,
wherein a float that swings about a float pivot shaft fixed on the cover as a water surface rises and falls and an opening/closing valve that swings about a valve pivot shaft fixed on the cover between a valve seat and an arm stopper are connected to each other by a spring having connecting portions at both ends respectively connected to a hole on a side of the float and to a spring bearing on a side of the opening/closing valve,
wherein the float is configured by a float main body, a float arm having one end to which the float main body is fixed and the other end on which the float pivot shaft is disposed, and a spring arm fixed to the float arm and formed with said hole at an end portion on an opposite side to the float arm,
wherein the opening/closing arm is configured by a valve arm having one end on which the valve pivot shaft is disposed and the other end on which the spring bearing is fixed, and a valve body fixed on the valve arm in a vicinity of the valve pivot shaft and configured to open and close the valve seat, and
wherein a buoyancy of the float compresses the spring, and a force of the compressed spring opens and closes the valve seat connected to the discharge opening, thereby discharging the drain water intermittently.

2. The float type drain trap according to claim 1, wherein, by being connected by the spring, the opening/closing valve only moves instantly between two positions for respectively opening and closing the valve seat, and keeps in its stationary conditions at the two positions even while the float rises and falls.

3. The float type drain trap according to claim 1, wherein the spring comprises a torsion coil spring.

4. The float type drain trap according to claim 1, wherein, when lengths between the both ends of the spring are compared with each other, a distance between the hole and the spring bearing as a length between the both ends of the spring in a situation where the float positions in the highest position and the valve is closed is set shorter so that the force of the compressed spring is large, and a distance between the hole and the spring bearing as a length between the both ends of the spring in a situation where the float positions in the lowest position and the valve is opened is set longer so that the force of the compressed spring is small.

5. The float type drain trap according to claim 1, wherein the float pivot shaft is disposed on a float bracket which is located on an upper side of the valve seat,
wherein the valve pivot shaft is disposed on a valve body bracket which is located on a lower side of the valve seat,
wherein the valve pivot shaft is positioned closer to the valve seat than the float pivot shaft, and
wherein the float bracket and the valve body bracket are united together as an one-piece bracket.

6. The float type drain trap according to claim 1, wherein one end of the spring at a side of the hole is formed in a C shape, a U shape or a V shape and is mounted into the hole of the float, and
wherein the other end of the spring at a side of the spring bearing is formed in a straight shape so as to be inserted into a bearing hole of the spring bearing.

7. The float type drain trap according to claim 1, wherein, in a condition where the hole positions on a side of the float main body with respect to a virtual line connecting the valve pivot shaft and the spring bearing, the force of the spring is transmitted from the spring bearing to the valve arm so as to push the valve seat in a closing direction, and
wherein, in a condition where the hole positions on an opposite side of the float main body, the force of the spring is transmitted from the spring bearing to the valve arm so as to push the valve seat in an opening direction.

8. The float type drain trap according to claim 7, wherein, when a case where the opening/closing valve is closed and the drain water flows in to cause the float to rise and the float crosses the virtual line connecting the valve pivot shaft to the spring bearing and a case where the opening/closing valve is opened and the drain water is discharged to cause the float to fall and the float crosses the virtual line are compared with each other, the distance between the hole and the spring bearing as the length between the both ends of the spring in the case where the float crosses the virtual line while rising is shorter than the distance between the hole and the spring bearing as the length between the both ends of the spring in the case where the float crosses the virtual line while falling.

* * * * *